United States Patent Office 3,318,789
Patented May 9, 1967

3,318,789
PROCESS FOR THE MANUFACTURE OF
19-NOR-STEROIDS
Oskar Jeger, Zollikerberg, Zurich, and Kurt Schaffner, Zurich, Switzerland, assignors to Ciba Corporation, New York, N.Y., a corporation of Delaware
No Drawing. Filed Dec. 16, 1963, Ser. No. 330,566
Claims priority, application Switzerland, Dec. 29, 1962, 15,286/62
16 Claims. (Cl. 204—158)

The present invention provides a new and simple process for the preparation of 19-nor-steroids whose ring A is not aromatic and in which there are used as starting materials $\Delta^5$-19-oxo-steroids.

The 19-nor-steroids, especially derivatives of 19-nor-testosterone and 19-nor-progesterone, have acquired considerable importance in recent years as anabolic agents, ovulation inhibitors and gestagenes.

Hitherto, the 19-nor-steroids mentioned above were obtainable in a simple manner only by the reduction of steroid compounds with an aromatic ring A, which steroid compounds had to be obtained from unsaturated 3-keto-steroids by the thermal elimination of the angular C-19-methyl group and simultaneous aromatization of the ring A. Since according to the methods described in Belgian Patent No. 606,179 and U.S. Patents Nos. 3,067,198 and 3,077,482, it is now possible to prepare $\Delta^4$- and $\Delta^5$-19-hydroxy-steroids in a simple manner from 19-unsubstituted $\Delta^5$-steroids, processes for the preparation of 19-nor-steroids that provide for the elimination of the angular substituent in these compounds are specially advantageous.

It has now been found that 19-nor-steroids whose ring A is not aromatic can be obtained when $\Delta^5$-19-oxo-steroids are irradiated with ultra-violet light and, if desired, the ketalized oxo and/or esterified hydroxy groups that may be present in the 19-nor-steroids obtained is/are split by known methods.

The process may be represented by the folowing partial formulae:

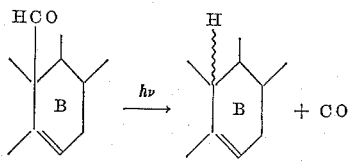

The $\Delta^5$-19-oxo-steroids used as starting materials are advantageously prepared from the corresponding known $\Delta^5$-19-hydroxy-steroids by oxidation, for example, with derivatives of hexavalent chromium, such as chromium (VI) oxide in an acidic or a basic solvent such as pyridine, glacial acetic acid and sulfuric acid/acetone, with alkali chromates or alkali bichromates, with silver oxide, with air or oxygen. The $\Delta^5$-19-hydroxy-steroids can be prepared under known conditions by the ketalization of 19-hydroxy-, or 19-acyloxy-$\Delta^4$-3-oxo compounds. A 19-acyloxy group that is present is converted into a 19-hydroxy group by mild basic hydrolysis.

In the process of the invention, the irradiation of the $\Delta^5$-19-oxo-steroids is advantageously performed in an organic solvent, for example, in an aliphatic, cycloaliphatic and/or aromatic hydrocarbon such as pentane, hexane, cyclohexane and/or benzene, and also in an aliphatic or cyclic ether such as diethyl ether, tetrahydrofuran or dioxane. Specially suitable are lower aliphatic alcohols, for example, methanol, ethanol, propanol or butanol.

As light source, there is advantageously used a mercury burner, especially a mercury high-pressure burner. In the process of the invention, the irradiation is advantageously carried out at a temperature within the range of 0 and +80° C. The irradiation process can be checked by volumetric determination of the carbon monoxide that is formed.

When there are used as starting materials compounds that contain one or several ketalized oxo groups and/or esterified hydroxy groups, the said groups can be split in known manner, if desired, in the products of the process. The former, for example, by the action of dilute organic or inorganic acids such as acetic acid, propionic acid, hydrochloric acid or sulfuric acid, or by catalytic amounts of anhydrous strong organic or inorganic acids such as sulfuric acid, perchloric acid or para-toluene sulfonic acid in a solvent that contains an oxo group such as acetone, methyl ethyl ketone, acetophenone or cyclohexanone. In this process there are formed, for example, from $\Delta^5$-3-ketals, the corresponding $\Delta^4$-3-oxo-19-nor-steroids. Esters can be split hydrolytically, for example, by the action of aqueous potassium carbonate or hydrogenolytically, for example, by the action of lithium aluminium hydride.

As suitable starting materials for the present process there are advantageously used $\Delta^5$-19-oxo-steroids that belong to the androstene, pregnene, cholestene, cholene, spirostene and cardenolide series. In addition to the said grouping, they may contain in one or more of the positions 1, 2, 3, 4, 6, 7, 8, 9, 11, 12, 14, 15, 16, 17, 20, and 21 or in the side chain further substituents such as lower alkyl groups, for example, methyl groups, and/or halogen atoms and/or free, esterified or etherified hydroxyl groups, and in the positions 3, 11, 12, 15, 16, 17, 20 and/or in the side chain oxo groups that advantageously are functionally converted, for example, ketalized oxo groups. The starting materials may also contain additional double bonds, especially in the ring D and in the side chain, and also oxido groups.

Specially important starting materials are those compounds that belong to the androstane and pregnane series and that correspond to the following general formulae:

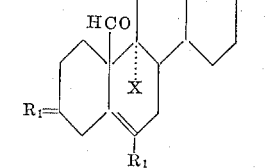 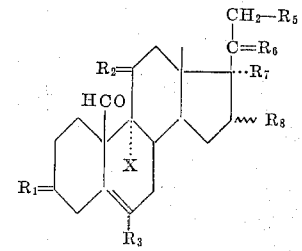

in which $R_1$, $R_2$ and $R_6$ stand for two hydrogen atoms, a hydrogen atom together with an hydroxyl group, a lower alkoxy group or an acyloxy group, two lower alkoxy groups or a lower alkylenedioxy group, for example, an ethylenedioxy group, $R_3$ and $R_8$ stand for a hydrogen atom or a lower alkyl group, $R_4$ stands for a hydroxyl, acyloxy or a lower alkoxy group in $\beta$-position together with a hydrogen atom or a saturated or unsaturated lower aliphatic hydrocarbon radical, for example, a lower alkyl, alkenyl or alkinyl group, or two lower alkoxy groups or a lower alkylenedioxy group, for example, an ethylenedioxy group, $R_5$ and $R_7$ stand for a hydrogen atom, a hydroxyl, an acyloxy or a lower alkoxy group, and X stands for a hydrogen atom or a halogen atom.

Specific starting materials are $\Delta^5$-3$\beta$:17$\beta$-dihydroxy-19-oxo-androstene, $\Delta^5$-3:3-ethylenedioxy-17$\beta$-hydroxy-19-oxo-androstene, $\Delta^5$-3:3:17:17-bis-ethylenedioxy-19-oxo-androstene, $\Delta^5$-3:3-ethylenedioxy-17$\beta$-hydroxy-17$\alpha$-lower alkyl-, alkenyl- or alkinyl-19-oxo-androstenes such as $\Delta^5$-

3:3-ethylenedioxy-17β-hydroxy-17α-methyl-, ethyl-, vinyl-, allyl-, ethinyl- or propinyl-19-oxo-androstene, Δ⁵-3:20-dihydroxy - 19 - oxo-pregnene, Δ⁵-3:3-ethylenedioxy-20-hydroxy-19-oxo-pregnene, Δ⁵ - 3:3:20:20-bis-ethylenedioxy-19-oxo-pregnene and Δ⁵-3:3-ethylenedioxy-17α-hydroxy-19:20-dioxopregnene and also the esters of the said hydroxyl compounds.

In the above-mentioned esters the acid radicals are especially such of aliphatic, cycloaliphatic, araliphatic, aromatic and heterocyclic carboxylic acids having 1 to 15 carbon atoms, for example, formic, methyl- or ethyl-carbonic, acetic, trifluoroacetic, propionic, butyric, trimethylacetic, valeric, caproic, enanthic, decanoic, hexahydrobenzoic, cyclopentylpropionic, phenylpropionic, benzoic, or furancarboxylic acid.

The products of the process are mostly known, biologically effective compounds or valuable intermediate products for the preparation of such compounds.

The following examples illustrate the invention. The ultra-violet absorption spectra are taken in an ethanol solution, the infra-red absorption spectra and the optical rotation in chloroform solution.

*Example 1*

1 gram of Δ⁵-3:3:17:17-bis-ethylenedioxy-19-hydroxy-androstene is dissolved in 20 ml. of pyridine, and the solution is added dropwise to a suspension of 1 gram of chromium(VI) oxide in 20 ml. of pyridine at 0 to 5° C., while stirring. After being allowed to react for 20 hours at room temperature, the mixture is diluted with methylene chloride and then filtered through a glass suction filter. After evaporating the filtrate in vacuo at 60 to 70° C., the residue is filtered through basic aluminium oxide (activity II) in a benzene solution. There are obtained 760 milligrams of crystalline Δ⁵-3:3:17:17-bis-ethylenedioxy-19-oxo-androstene; the decomposition point is 169.5 to 171° C. after the product has been recrystallized five times from a mixture of methylene chloride and petroleum ether. Infra-red spectrum: $\nu_{max}$=2700, 1712, 1670 cm.$^{-1}$. Ultra-violet spectrum: $\lambda_{max}$=226 mμ ($\epsilon$=1255), 310 mμ ($\epsilon$=113), [α]$_D$=−249° (c.=1.44).

The hydroxydiketal used as starting material is advantageously prepared from 19-acetoxy-androstenedione by ketalization by means of glycol in benzene solution (catalyst: para-toluene sulfonic acid) and subsequent alkaline hydrolysis.

*Example 2*

A solution of 1 gram of Δ⁵-3:3:17:17-bis-ethylenedioxy-19-oxo-androstene in 200 ml. of ethanol is irradiated for 2 hours by means of a mercury high-pressure burner. 1 equivalent of carbon monoxide is developed. The solution is evaporated to dryness in vacuo and the residue is filtered through 100 grams of basic aluminium oxide (activity II) in a benzene solution. There are obtained 875 milligrams of crystalline Δ⁵-3:3:17:17-bis-ethylenedioxy-10ξ-estrene, that melts at 131.5 to 132° C. after being recrystallized four times from a mixture of ether and petroleum ether (660 milligrams). Optical rotation [α]$_D$=−13° (c.=1.41). Infra-red spectrum: $\nu_{max}$=958, 950, 904, 872, 861, 834 cm.$^{-1}$.

*Example 3*

100 milligrams of para-toluene sulfonic acid in 5 ml. of water are added to a solution of 215 milligrams of Δ⁵-3:3:17:17-bis-ethylenedioxy-10ξ-estrene in 30 ml. of acetone and the whole is boiled for 1 hour. The reaction solution is then diluted with water. 135 milligrams of crystals are precipitated and are filtered through 20 grams of basic aluminium oxide in a benzene solution. The purified Δ⁴-3:17-dioxo-19-nor-androstene melts at 164 to 165° C. after recrystallization from a mixture of methylene chloride and ether; (identified with authentic material by means of the mixture test and comparison of the infra-red spectra).

*Example 4*

500 milligrams of Δ⁵-3:3:20:20-bis-ethylenedioxy-19-oxo-androstene (prepared from 1.0 gram of 19-oxyprogesterone by ketalization, basic hydrolysis and a subsequent short oxidation at 0° C. by means of a solution of 8 N chromium(VI) oxide in sulfuric acid/acetone) are dissolved in 150 ml. of methanol and irradiated by means of a mercury high-pressure burner. The reaction is checked by measurement of the amount of carbon monoxide that is developed. After 2½ hours, the solution is evaporated in a water-jet vacuum, the residue is dissolved in benzene and filtered through 50 grams of neutral aluminium oxide (activity II). The crude product so obtained (422 milligrams of Δ⁵-3:3:20:20-bis-ethylenedioxy-10ξ-19-nor-pregnene) is then dissolved in 15 ml. of acetic acid of 66% strength and heated for 15 minutes at 95 to 100° C. The reaction mixture is then diluted with water, extracted with a 5:1 mixture of ether and methylene chloride, the organic phase is washed with a saturated sodium bicarbonate solution and water until it is neutral and it is then dried and evaporated in a water-jet vacuum. After being recrystallized twice from a mixture of methylene chloride and petroleum ether, the residue yields 19-nor-progesterone that melts at 143 to 145° C.

*Example 5*

1.5 grams of 19-hydroxy-testosterone are acylated overnight with 8 ml. of acetoanhydride in 8 ml. of pyridine. The diacetate (1.6 grams) that is obtained after the usual working up process is dissolved in benzene and, after the addition of 10 ml. of glycol and 50 milligrams of para-toluene sulfonic acid, the solution is boiled for 6 hours at the water separator while stirring. The reaction mixture is poured into an ice-cold saturated sodium bicarbonate solution, extracted with ether, the organic layer is washed with water and is then dried and evaporated. The crude Δ⁵-3:3-ethylenedioxy-17β:19-diacetoxy-androstene is boiled for 1 hour under reflux with 1.2 equivalents of sodium bicarbonate in a 9:1 mixture of methanol and water. After cooling the reaction mixture and after the addition of water, the reaction mixture is worked up in the usual manner to produce crude Δ⁵-3:3-ethylenedioxy-17β-acetoxy-19-hydroxy-androstene (1.4 grams) which, in accordance with the process described in Example 1, yields Δ⁵-3:3-ethylenedioxy - 17β-acetoxy-19 - oxo-androstene in 70% yield. This product (750 milligrams) is dissolved in 150 ml. of ethanol and is irradiated for 2 hours by means of a mercury high-pressure burner, while passing through nitrogen, at 20° C. The solution is then evaporated in a water-jet vacuum, the crude Δ⁵-3:3-ethylenedioxy-17β-acetoxy-19-nor-androstene is dissolved in 20 ml. of acetone, 50 milligrams of para-toluene sulfonic acid are added, and the slightly colored solution is allowed to stand for 15 hours at 20° C. After diluting the solution with water and subsequently extracting it with ether, there is obtained a crude product which, after being recrystallized three times from a mixture of ether and petroleum ether, yields pure O-acetyl-19-nor-testosterone that melts at 93 to 94° C. This is identical with an authentic preparation in every respect. By hydrolysis with aqueous potassium carbonate there is obtained therefrom the 19-nor-testosterone melting at 111–112° C.

*Example 6*

500 mg. of Δ⁵-3β-acetoxy-19-hydroxy-cholestene of M.P. 119–120° C. are dissolved in 20 ml. of pyridine and the solution obtained is dropped with stirring at 0° C. into a mixture of 0.5 g. chromium(VI) oxide and 10 ml. of pyridine. After one day's standing at room temperature the reaction mixture is diluted with methylene chloride, filtered and the filtrate evaporated in a water-jet vacuum. The residue is taken up in 100 ml. of cyclohexane and irradiated with a mercury high-pressure burner until evolution of carbon monoxide has ceased. The solution is filtered through 50 g. of neutral alumina (activity II) and the filtrate evaporated under reduced pressure.

The residue (O-acetyl-19-nor-cholesterol) is dissolved in 10 ml. of tetrahydrofuran and the solution obtained dropped with stirring into a boiling suspension of 150 mg. of lithium aluminium hydride in 10 ml. of tetrahydrofuran and the whole is boiled for an additional hour. After cooling, there are added successively to the reaction mixture, 0.5 ml. of ethyl acetate in 5 ml. of tetrahydrofuran, 0.4 ml. of water in 5 ml. of tetrahydrofuran, and some anhydrous sodium sulfate. The whole is filtered, the residue washed with tetrahydrofuran and the filtrate evaporated in a water-jet vacuum. After several recrystallizations of the residue from methanol there is obtained 19-nor-cholesterol, M.P. 108–110° C., optical rotation $[\alpha]_D = +15°$ (c.=1).

*Example 7*

According to the method described in the preceding examples there are obtained $\Delta^4$-3-oxo-17β-decanoyloxy-estrene melting at 38–39° C., $\Delta^4$-3-oxo-17α-methyl-17β-hydroxy-estrene melting at 150–152° C., $\Delta^4$-3-oxo-17α-ethinyl-17β-hydroxy-estrene melting at 204–208° C. and 17α-acetoxy-19-nor-progesterone melting at 222–224° C.

What we claim is:

1. Process for the manufacture of 19-nor-steroids whose ring A is not aromatic, wherein a $\Delta^5$-19-oxo-steroid in an organic solvent is irradiated with ultra-violet light.
2. Process according to claim 1, wherein in the 19-nor-steroids obtained ketalized oxo groups present are split up to form free oxo groups.
3. Process according to claim 1, wherein the 19-nor-steroids obtained esterified hydroxy groups present are split up to form free hydroxy groups.
4. Process as claimed in claim 1, wherein irradiation is performed in a lower aliphatic alcohol.
5. Process as claimed in claim 1, wherein a mercury burner is used as light source.
6. Process as claimed in claim 1, wherein irradiation is performed within the range of 0 and +80° C.
7. Process as claimed in claim 1, wherein a $\Delta^5$-19-oxo-androstene is used as starting material.
8. Process as claimed in claim 1, wherein a $\Delta^5$-19-oxo-pregnene is used as starting material.
9. Process as claimed in claim 1, wherein the starting material is selected from the group of compounds having the formulae

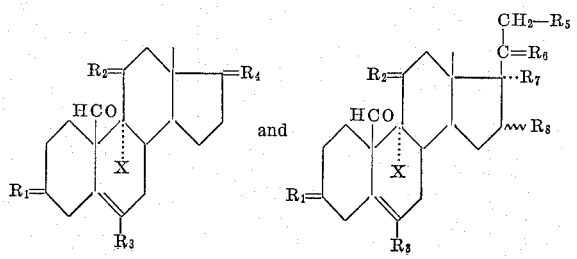

in which $R_1$, $R_2$ and $R_6$ stand for a member selected from the group consisting of

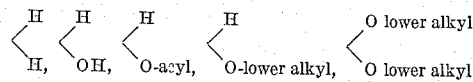
and

lower alkylene, $R_3$ and $R_8$ stand for a member selected from the group consisting of hydrogen and lower alkyl, $R_4$ stands for a member selected from the group consisting of

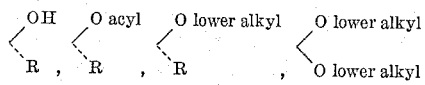
and

lower alkylene, R stands for a member selected from the group consisting of hydrogen and a lower aliphatic hydrocarbon radical, $R_5$ and $R_7$ stand for a member selected from the group consisting of hydrogen, hydroxy, alcyloxy and lower alkoxy and X stands for a member selected from the group consisting of hydrogen and halogen.

10. Process as claimed in claim 1, wherein $\Delta^5$-3:3:17:17-bis-ethylenedioxy-19-oxo-androstene is used as starting material.
11. Process as claimed in claim 1, wherein $\Delta^5$-3:3-ethylenedioxy-17β-acetoxy-19-oxo-androstene is used as starting material.
12. Process as claimed in claim 1, wherein $\Delta^5$-3:3:20:20-bis-ethylenedioxy-19-oxo-pregnene is used as starting material.
13. Process as claimed in claim 1, wherein $\Delta^5$-3β-acetoxy-19-oxo-cholestene is used as starting material.
14. Process as claimed in claim 1, wherein $\Delta^5$-3:3-ethylenedioxy-17β-decanoyloxy-19-oxo-androstene is used as starting material.
15. Process as claimed in claim 1, wherein $\Delta^5$-3:3-ethylenedioxy-17α-methyl- or -ethinyl - 17β - hydroxy-19-oxo-androstene is used as starting material.
16. Process is claimed in claim 1, wherein $\Delta^5$-3:3:20:20 - bis-ethylenedioxy-17α-acetoxy-19-oxo-pregnene is used as starting material.

No references cited.

JOHN H. MACK, *Primary Examiner.*

H. S. WILLIAMS, *Assistant Examiner.*